United States Patent
Yamashita et al.

(10) Patent No.: US 7,190,403 B2
(45) Date of Patent: Mar. 13, 2007

(54) SOLID-STATE IMAGE PICKUP APPARATUS HAVING A BROAD PHOTOMETRIC RANGE AND A PHOTOMETRIC METHOD FOR THE SAME

(75) Inventors: Hitoshi Yamashita, Asaka (JP); Naoki Kubo, Asaka (JP); Keizou Uchioke, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 779 days.

(21) Appl. No.: 10/621,562

(22) Filed: Jul. 18, 2003

(65) Prior Publication Data
US 2004/0017498 A1 Jan. 29, 2004

(30) Foreign Application Priority Data
Jul. 19, 2002 (JP) .............................. 2002-210561

(51) Int. Cl.
H04N 5/238 (2006.01)
H04N 5/235 (2006.01)
H04N 5/335 (2006.01)
H04N 3/14 (2006.01)
H01L 31/062 (2006.01)
H01L 27/00 (2006.01)

(52) U.S. Cl. .................. 348/364; 348/229.1; 348/315; 348/275; 348/302; 257/291; 250/208.1

(58) Field of Classification Search ................ 348/275, 348/364, 315
See application file for complete search history.

(56) References Cited

U.S. PATENT DOCUMENTS

| | | | | |
|---|---|---|---|---|
| 4,558,365 A | * | 12/1985 | Ochi | ........................... 348/275 |
| 4,602,289 A | * | 7/1986 | Sekine | ..................... 250/208.1 |
| 5,111,301 A | * | 5/1992 | Haruki et al. | ................ 348/364 |
| 5,565,918 A | * | 10/1996 | Homma et al. | ............. 348/364 |
| 6,236,434 B1 | * | 5/2001 | Yamada | ....................... 348/315 |
| 6,570,620 B1 | * | 5/2003 | Yoshimura et al. | .......... 348/362 |
| 6,630,960 B2 | * | 10/2003 | Takahashi et al. | ........ 348/229.1 |
| 6,831,692 B1 | * | 12/2004 | Oda | ........................... 348/275 |
| 6,850,277 B1 | * | 2/2005 | Misawa | ....................... 348/315 |
| 6,982,759 B2 | * | 1/2006 | Goto | ........................... 348/302 |
| 7,116,367 B2 | * | 10/2006 | Shinohara | .................... 348/308 |
| 2003/0141564 A1 | * | 7/2003 | Kondo et al. | ................ 257/442 |

FOREIGN PATENT DOCUMENTS

JP  5-207376 A  8/1993
JP  09-205589   *  8/1997

* cited by examiner

Primary Examiner—David Ometz
Assistant Examiner—Nhan T. Tran
(74) Attorney, Agent, or Firm—Birch, Stewart, Kolasch & Birch, LLP

(57) ABSTRACT

A solid-state image pickup apparatus includes a timing signal generator for generating timing signals. Particular gates formed in each of photosensitive cells arranged in an image pickup section are driven independently or simultaneously in response to the timing signals. In an independent drive mode, outputs each having particular sensitivity are obtained from the different photosensitive regions of the individual cell by one time of exposure, covering a range of sensitivity as broad as one achievable with repeated photometry. This reduces the number of times of photometry for determining adequate exposure. In a simultaneous drive mode, outputs are produced in the usual manner. An exposure value calculator converts the resulting image signals to values having a predetermined format while an exposure parameter determining section determines exposure parameters if those values are adequate.

8 Claims, 7 Drawing Sheets

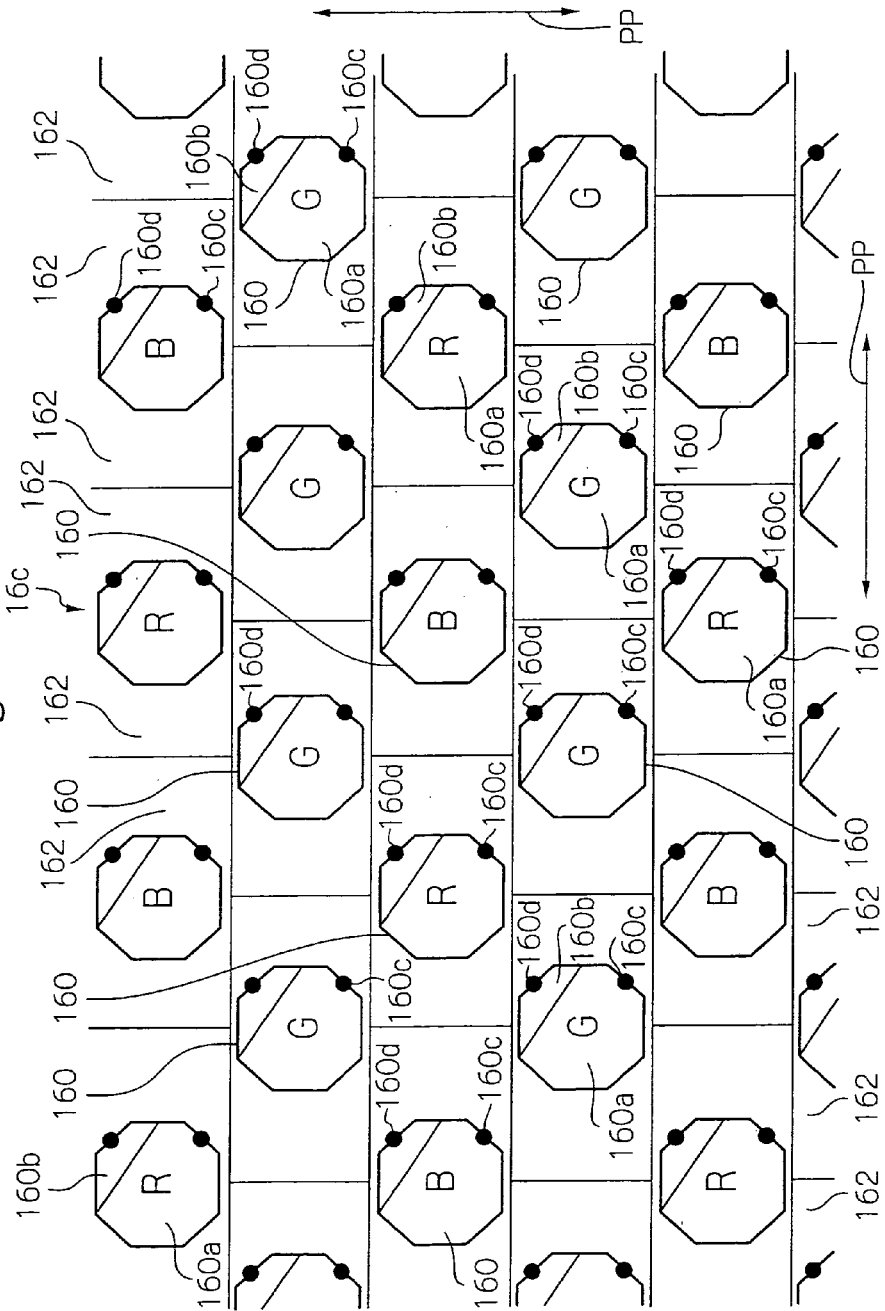

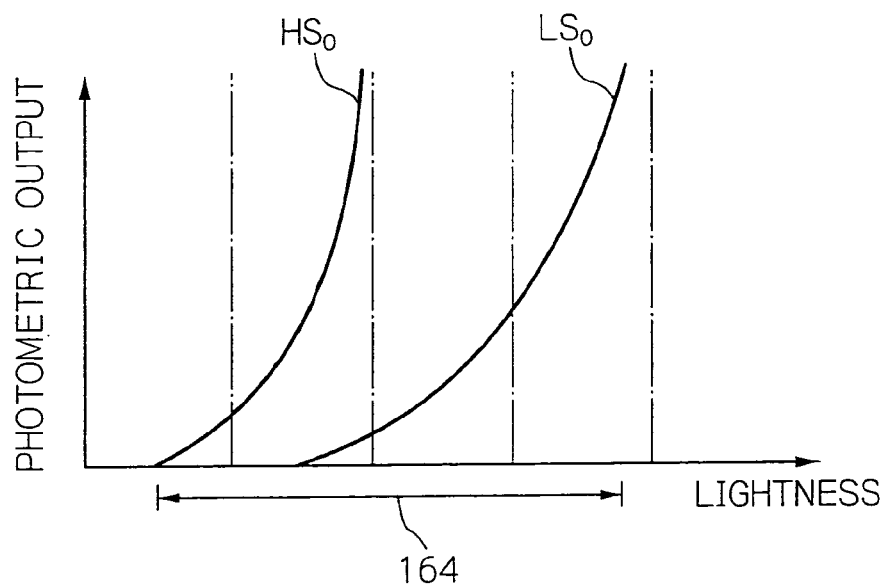
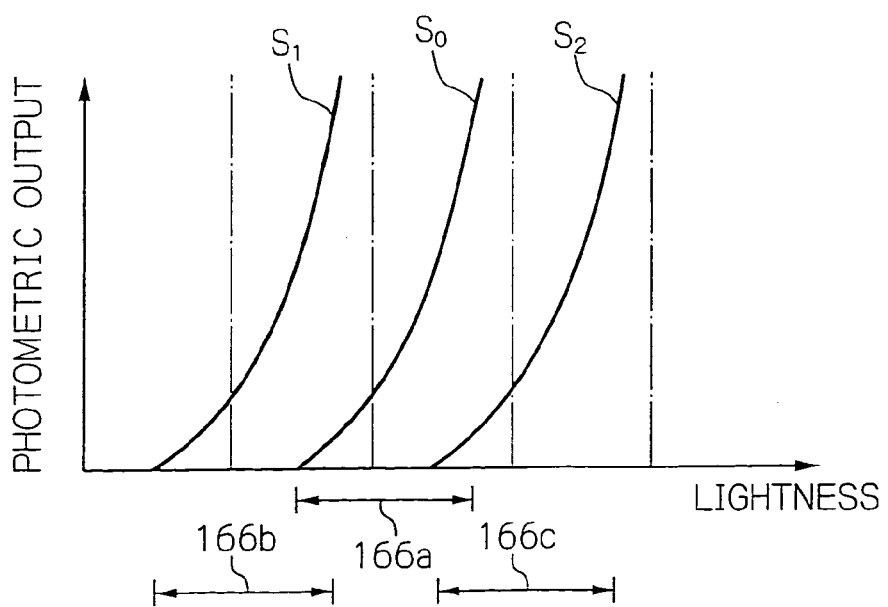

SOLID-STATE IMAGE PICKUP APPARATUS HAVING A BROAD PHOTOMETRIC RANGE AND A PHOTOMETRIC METHOD FOR THE SAME

BACKGROUND OF THE INVENTION

1. Field of the Invention

The present invention relates to a solid-state image pickup apparatus of the type effecting photometry with a solid-state image sensor and a photometric method for the same.

2. Description of the Background Art

A digital camera, for example, is configured to set up pickup parameters, including a shutter speed, an F number, and a distance of the subject from the camera, to pick up a desired subject field in an optimum condition. In order to set up the parameters, the camera executes photometry, prior to capturing the image of a subject field. First, the user operates the camera, before a shot, to cause photometry and range finding in terms of the parameters. More specifically, the camera determines whether or not the quantity of light metered by photometry is adequate and whether or not the focussing resultant from range finding is adequate.

As for photometry, it is likely, in the worst case, that the photometric output saturates due to an excessive quantity of light or a signal cannot be sensed at all due to a short quantity of light. In such a case, the level gain of the photometric output signal is adjusted in accordance with the input signal level. In this manner, the first adjustment is effected such that the preselected quantity of light is incident to the photosensitive array of the camera. This is done by adjusting exposure parameters included in the pickup parameters of the camera. Subsequently, the camera again executes photometry with the adjusted exposure parameters and again determines whether or not the quantity of incident light is adequate. The camera repeats the above-mentioned procedure until it attains adequate values of the exposure parameters. As for range finding, too, the camera repeats a decision on focus error until the focus error becomes zero. The procedure for automatically executing the above sequence of steps is generally referred to as an AE (Automatic Exposure)/AF (Automatic Focusing) control procedure.

One of the problem with the AE/AF procedure is that a substantial period of time is necessary for attaining the adequate pickup parameters by repeated processing, resulting in possibly missing a desired scene. Should priority be given only to desired timing for shooting a particular scene, the camera would pick up the scene with the values of pickup parameters deviated from adequate ones and would therefore make the resulting picture unsatisfactory.

Japanese patent laid-open publication No. 207376/1993 proposes a solid-state image pickup apparatus and a control method for the same in which the individual photosensitive cell, or photodiode, is divided into a plurality of regions. In this prior art scheme, a switching device alternatively selects either one of the regions of the individual photosensitive cell to thereby vary the area to which light is incident and therefore the sensitivity of the cell or pixel. More specifically, the apparatus is configured to reduce a photosensitive area for a relatively lighter subject or increase it for a relatively darker subject for thereby adjusting the sensitivity. This, according to the above document, reduces the AE/AF processing time while broadening the dynamic range.

Further, the document mentioned above describes that the sensitivity is switched in accordance with information representative of the lightness of a subject at the same time as the AF control. A photometry device mounted on the camera for outputting the above information for AE control may have photosensitive cells arranged on a single chip together with a sensor for use in switching the sensitivity, so that the sensitivity can be switched in accordance with lightness information. However, the sensitivity switching sensor and a sensor for photometry mounted on a single chip are not accurately coincident with each other in the direction or the range of photometry and therefore lack accuracy.

In light of the above, to select an appropriate region of the individual photosensitive cell, i.e. appropriate sensitivity accurately matching with a subject, the level of a signal output from the sensitivity switching sensor is monitored to determine the lightness with accurate sensitivity. It is to be noted that to select particular sensitivity from the individual photosensitive cell means to execute photometry control with that cell. At this instant, every time the sensitivity of the photosensitive cell is switched between high and low, the sensitivity is reset; when a subject is relatively lighter, integration is effected two consecutive times. The document describes that because each time of integration ends in a short period of time, the entire integration for setting the sensitivity can complete in a short period of time.

As stated above, the procedure described above executes integration two times with high and low sensitivity, i.e. executes photometry by repeating exposure twice and reading out signal charges twice in total. Although the document teaches that the entire photometry time should only be shorter than the maximum integration time, exposure must eventually be executed once or twice in accordance with the lightness of a subject to be imaged. The number of times of exposure that is changeable in dependent on the lightness of a subject is undesirable when it comes to the reduction of photometry time.

SUMMARY OF THE INVENTION

It is an object of the present invention to provide a solid-state image pickup apparatus capable of reducing the photometry time and a photometric method for the same.

In accordance with the present invention, a solid-state image pickup apparatus of includes a solid-state image sensor in which a plurality of photosensitive cells are arranged in a bidimensional array for converting light incident from a desired scene to corresponding signal charges. A plurality of vertical transfer paths transfer the signal charges in the vertical direction, while a horizontal transfer path transfers the signal charges transferred by the vertical transfer paths in the horizontal direction. The photosensitive cells each have a photosensitive area divided into at least two photosensitive regions. The photosensitive cells around a given photosensitive cell each are shifted from the given photosensitive cell by substantially half a pitch which is defined as a distance between the photosensitive cells adjoining each other in the horizontal or the vertical direction. Each two of the plurality of vertical transfer paths are formed between the photosensitive cells arranged in the horizontal direction and extend round one array of photosensitive cells each. The image sensor is formed with electrodes for feeding open/close control signals to gates, which have an opening/closing function for reading out the signal charges from the photosensitive regions of the photosensitive cells either individually or simultaneously. A timing signal generator generates timing signals for driving the electrodes of each photosensitive cell either individually or simultaneously. A format converter converts image signals derived from the signal charges, which are read out from the image sensor, to corresponding values having a predetermined format for photometry. A parameter determining circuit uses a quantity of light incident during an exposure time, and determines whether or not the values with the preselected format are adequate, and weights, if the values are adequate, the values to produce an amount of exposure, thereby determining exposure parameters for picking up the desired scene.

A photometric method for the above image pickup apparatus is also disclosed.

BRIEF DESCRIPTION OF THE DRAWINGS

The objects and features of the present invention will become more apparent from consideration of the following detailed description taken in conjunction with the accompanying drawings in which:

FIG. 2 is an enlarged plan view schematically showing part of a solid-state image sensor included in the illustrative embodiment;

FIGS. 3A and 3B are graphs for use in comparing the image sensor of the illustrative embodiment with a conventional image sensor with respect to a relation between the lightness output from the individual photosensitive cell and the corresponding photometric output;

DESCRIPTION OF THE PREFERRED EMBODIMENT

Figure 1:
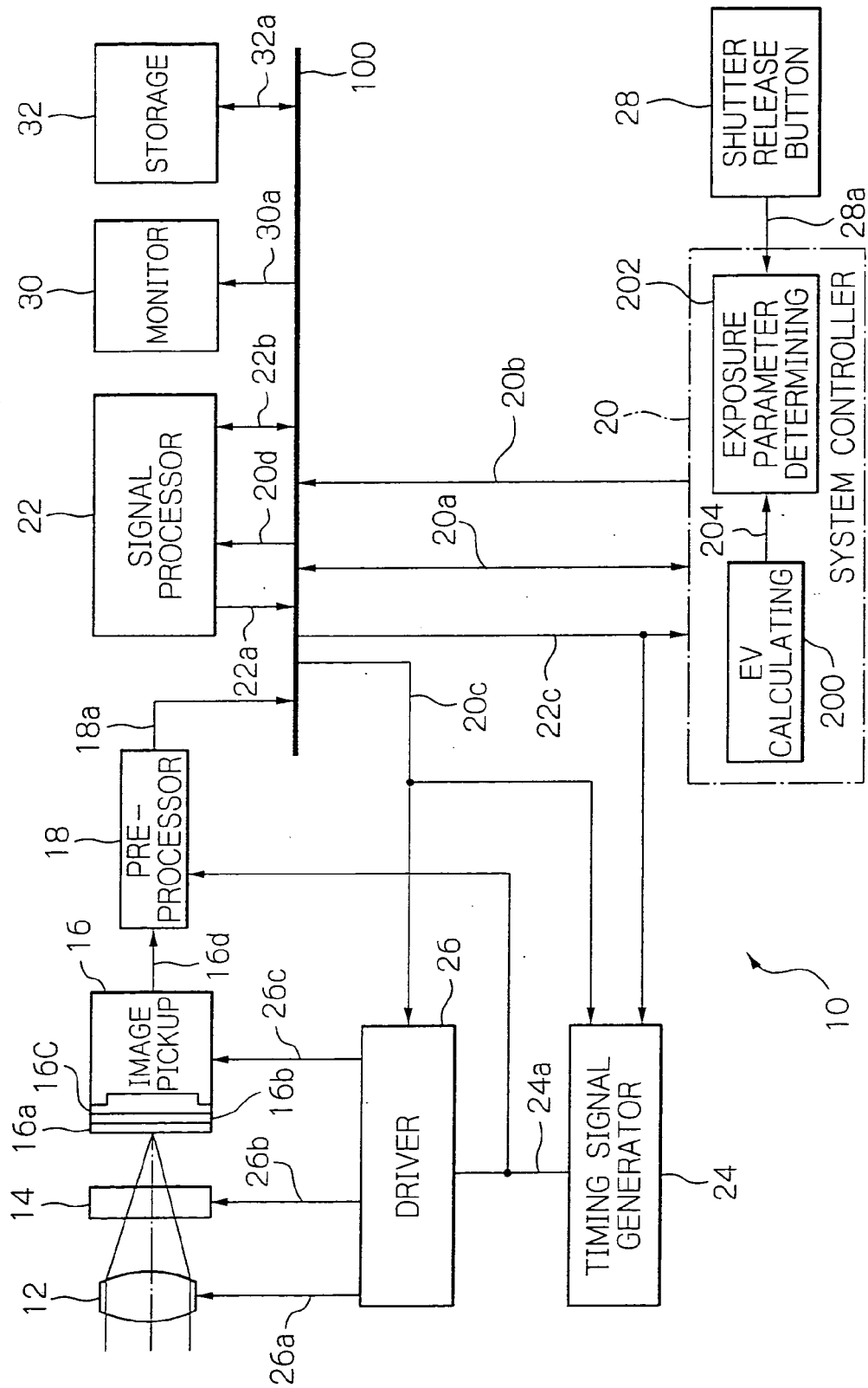
FIG. 1 is a schematic block diagram showing a solid-state image pickup apparatus embodying the present invention.

Referring to FIG. 1 of the drawings, a solid-state image pickup apparatus embodying the present invention is implemented as a digital camera by way of example. Structural elements not directly relevant to the understanding of the present invention are not shown in FIG. 1 nor will be described specifically. In the following description, signals are designated by reference numerals attached to connect lines on which they appear.

As shown in FIG. 1, the digital camera, generally 10, includes an optical lens system 12, an iris control mechanism 14, an image pickup section 16, a preprocessor 18, a system controller 20, a signal processor 22, a timing signal generator 24, a driver 26, a shutter release button 28, a monitor 30, and a storage 32 interconnected as illustrated. The optical lens system 12 includes an AF control mechanism, not shown, for shifting optical lenses to focus the camera 10 onto a desired subject. More specifically, a drive signal 26a is fed from the driver 26 to a motor, not shown, included in the AF control mechanism.

The iris control mechanism 14 is implemented as an AE (Automatic Exposure) mechanism for controlling the quantity of light incident via the lens system 12 and also includes a motor not shown. This motor turns a ring portion, not shown, included in the iris control mechanism 14 in response to a drive signal 26b fed from the driver 26. More specifically, the motor causes iris blades included in the ring portion to overlap each other and form a round iris or lens opening, so that an incident light beam is restricted by the iris. Alternatively, the iris control mechanism 14 may be implemented as a mechanical shutter built in the lens system 12 as a lens shutter.

The image pickup section 16 includes an optical low-pass filter 16a, a color filter 16b, and a solid-state image sensor 16c. The optical low-pass filter 16a limits the spatial frequency of the incident light to the Nyquist frequency or below. The color filter 16b has color filter segments of, e.g. three primary colors R (red), G (green) and B (blue) arranged in a certain pattern in one-to-one correspondence to the photosensitive cells formed in the image sensor 16c. The color filter 16b is thus disposed in dependent on the arrangement of the photosensitive cells of the image sensor 16c. Having the photosensitive cells arranged in a bidimensional array, the image sensor 16c transduces an optical image focused on the array of photosensitive cells to a corresponding electric signal.

More specifically, a drive signal 26c, specific for an operation mode, is fed from the driver 26 to the image sensor 16c. The image sensor 16c produces, in response to the drive signal 26c, signal charges from incident light, transfers the signal charges, and executes Q/V conversion with the signal charges for putting an analog voltage signal 16d. The analog voltage signal 16d is input to the preprocessor 18. The image sensor 16c will be described in more detail later.

The preprocessor 18 includes a CDS (Correlated Double Sampling) circuit, a GCA (Gain-Controlled Amplifier), and an ADC (Analog-to-Digital Converter) although not shown specifically. The preprocessor 18 cancels noise contained in the input analog voltage signal 16d, shapes the waveform of the resulting noise-free voltage signal and then digitizes the wave-shaped voltage signal, thus outputting image data 18a. The image data 18a thus output are all delivered to the system controller 20 and signal processor 22 over a system bus 100.

The system controller 20 is implemented by a microcomputer or a CPU (Central Processing Unit) adapted for controlling the common sections of the camera 10 and the sections assigned to digital processing. The system controller 20 operates in response to a signal 28a representative of the operation of the shutter release button 28. Photometric data are input to the system controller 20 on the system bus 100 and a data bus 20a. The system controller 20 includes an EV (Exposure Value) or estimated value calculating section 200 and an exposure parameter determining section 202.

By using the photometric data mentioned above, the EV calculating section 200 calculates an EV value representative of the quantity of incident light in a predetermined format with respect of each of a plurality of blocks constituting the entire image frame. The EV value refers to a synthetic value consisting of an F number and a shutter speed or exposure time and representative of the ability to pass incident light. The EV calculating section 200 delivers the resulting block-by-block EVs 204 to the exposure parameter determining section 202.

The exposure parameter determining section 202 determines, based on the block-by-block EVs 204, whether or not the amount of exposure is adequate and then weights the adequate EV to produce the final amount of exposure. Subsequently, the determining section 202 produces exposure parameters representative of an F number and a shutter speed or exposure time from the final amount of exposure. Thereafter, the system controller 20 generates a control signal 20b in accordance with the exposure parameters thus produced. The control signal 20b is delivered to the timing signal generator 24 and driver 26 on the system bus 100 as a control signal 20c. At the same time, the control signal 20b is fed to the signal processor 22 on the system bus 100 as a control signal 20d.

The system controller 20 controls the preprocessor 18, storage 32 and so forth as well although connections thereto are not shown specifically.

The signal processor 22 includes a signal generator, a memory, a corrector, a pixel interpolator, a matrix processor, and a compressor/expander although not shown specifically. The signal generator operates in response to the control signal 20d and includes a PLL (Phase-LockedLoop) capable of generating a plurality of different frequencies. More specifically, the signal generator is adapted to multiply the oscillation frequency generated from its oscillator, or reference clock, to thereby generate a plurality of clock signals 22a each having a particular frequency. The clock signals 22a are selectively fed to the system controller 20 and timing signal generator 24 over the system bus 100 as a clock signal 22b.

The timing signal generator 24 generates timing signals derived from a basic clock and delivers it to the signal processor 22, although not shown specifically. The timing signals include a horizontal synchronous signal HD, a vertical synchronous signal VD and clocks meant for various sections in the apparatus, which will be described later.

The image data 18a output from the preprocessor 18 are input to the memory over the system bus 100 and a data bus 22b and temporarily stored therein. Particularly, in a movie mode available with the camera 10, image data derived from signal charges, which are thinned down to, e.g. one-fourth in the vertical direction, are input to the memory. In any case, the image data thus stored in the memory may be read out while being thinned down in the horizontal direction in order to increase the aspect ratio and reading speed. In this case, too, the image data are so read out as not to disturb the original color arrangement or pattern. Consequently, the image data are thinned down in the horizontal direction when read out from the memory. The memory should preferably be implemented by a nonvolatile memory to cope with repeated read-out.

The image data read out from the above-described memory are input to the corrector. The corrector may for example include a lookup table for use in gamma correction. The corrector uses data listed in the lookup table as part of image preprocessing to execute gamma correction with the input image data. Further, the corrector includes an operation circuit for correcting white balance (WB), tonality and other factors as usual. The image data thus corrected are fed from the corrector to the pixel interpolator.

The EV calculating section 200 and exposure parameter determining section 202 stated earlier may be included in the signal processor 22, if desired. In such a case, the exposure parameters output from the signal processor 22 will be delivered to the system controller on the system bus 100 and data bus 20a.

The pixel interpolator interpolates the pixel data. More specifically in the illustrative embodiment, because the image pickup section 16 includes a single color filter 16b, the photosensitive cells included in the section 16 cannot generate colors other than those of the actual color filter segments. To solve this problem, in the camera or still picture mode also available with the camera 10, the pixel interpolator is adapted to generate pixel data in the colors other than those of the actual color filter segments, feeding there resulting planar image data to the matrix processor. The pixel interpolator may additionally function to broaden the frequency band of the generated pixel data.

Further, in an application in which the solid-state image sensor 16c of the image pickup section 16 is of the type having a so-called honeycomb configuration in which nearby pixels are shifted from each other in the vertical or horizontal direction, the pixel interpolator uses the gamma-corrected image data to generate interpolated R, G and B image data at the actual pixel positions where pixels are actually present and the virtual pixel positions where pixels are absent.

The matrix processor uses the image data fed from the pixel interpolator and preselected coefficients to generate luminance data Y and color-difference data $C_b$ and $C_r$. The luminance data Y and color-difference data $C_b$ and $C_r$ so generated are input to the compressor/expander. Let these data Y, $C_b$ and $C_r$ be referred to as image data Y/C hereinafter.

The compressor/expander compresses, in the camera mode, the image data Y/C under the JPEG (Joint Photographic coding Experts Group) standard or compresses, in the movie mode, the image data Y/C under the MPEG (Moving Picture coding Experts Group)-1, MPEG-2 or similar standard. The compressor/expander writes in the compressed image data Y/C into the storage 32 on the data bus 22b, system bus 100 and a data bus 32a. When the image data Y/C are read out from the storage 32, they are delivered to the signal processor 22 and expanded thereby. Expansion is inverse in procedure to compression.

Further, the signal processor 22 transforms the image data generated or the image data Y/C expanded during reproduction to R, G and B image data 22b, and feeds the image data 22b to the monitor 30 on the system bus 100 and a data bus 30a. The monitor 30 displays the image data 22b in the form of a visual picture under the control of a display controller, not shown.

In an application in which the camera 10 is capable of interchanging image data with external equipment, the signal processor 22 should preferably include an external I/F (interface) circuit. For the external I/F circuit, use may be made of a PIO (Programmed Input/Output), a UART (Universal Asynchronous Receiver/Transmitter), a USB (Universal Serial Bus) or an I/F based on the IEEE (the Institute of Electrical and Electronics Engineers) 1394 standard.

The shutter release button 28 has a first and a second stepwise stroke. More specifically, the shutter release button 28 conditions the camera 10 for preliminary pickup when depressed by the first stroke S1 or conditions it for actual pickup when depressed by the second stroke S2. A trigger signal 28a indicative of the stroke S1 or S2 is sent out from the shutter release button 28 to the system controller 20.

The clock signal 22c is fed from the signal processor 22 to the timing signal generator 24 on the system bus 100 as a reference clock signal 22c. The timing signal generator 24 generates timing signals in response to the reference clock signal 22c and control signal 20c, which is fed from the system controller 20. The above timing signals include a vertical and a horizontal synchronous signal, field shift pulses, and a vertical and a horizontal transfer signal. Such timing signals, collectively labeled 24a, are selectively delivered to the driver 26 and preprocessor 18 as well as to the system controller 20 and signal processor 22 (connections thereto are not shown) in accordance with the operation.

The driver 26 includes a drive circuit, not shown, for generating the drive signals 26a, 26b and 26c in response to the timing signals 24a and control signal 20c. More specifically, the driver 26 feeds, in response to the control signal 20c, the drive signals 26a and 26b to the lens system 12 and iris control mechanism 14, respectively, for thereby causing them to perform AF control and AE control. Further, the driver 26 feeds the drive signal 26c to the image sensor 16c in response to the timing signals 24a. The drive signal 26c causes the image sensor 16c to store signal charges in the individual photosensitive cells by photoelectric transduction during exposure, read out the signal charges from desired photosensitive regions or cells to corresponding vertical transfer registers, vertically transfer the signal charges from the vertical transfer registers to horizontal transfer registers while executing line shift, and then horizontally transfer the signal charges via the horizontal transfer registers.

To the monitor 30, the image data 22b are transferred from the signal processor 22 on the system bus 100 and data bus 30a. The monitor 30 is generally implemented by an LCD (Liquid Crystal Display) monitor, and includes an LCD controller, not shown, which applies a voltage in accordance with the image data 22a for thereby switching the orientation of LC molecules. As a result, the monitor 30 displays the image data 22b in the form of a visual picture. The LCD monitor may, of course, be replaced with any other miniature display unit that allows the user to confirm a picture appearing thereon and saves electric power.

The storage 32 includes a recording medium for storing the image data fed from the signal processor 22 on the data bus 22b, system bus 100 and data bus 32a. The recording medium may be implemented by any one of a semiconductor memory, an optical disk, a magneto-optical disk and so forth. In the storage 32, data are written into or read out from the recording medium by a pickup or the combination of a pickup and a magnetic head matching with the kind of the recording medium and also controlled by the system controller 20.

The configuration of the image pickup section 16 unique to the illustrative embodiment will be described with reference to FIG. 2. As shown, the image pickup section 16 includes photosensitive cells or photodiodes (simply referred to as cells hereinafter) 160 arranged bidimensionally at a pitch or interval, PP, in both of horizontal and vertical directions, as viewed on each row and each column. Also, the cells 160 around a given cell 160 each are shifted from the given cell by a distance that is equal to one-half of the pitch PP. In this manner, the cells 160 are densely arranged in the photosensitive cell array of the image pickup section 16. Consequently, vertical transfer paths 162 each extend in such a manner as to steer clear of the cells 160.

In the illustrative embodiment, the cells 160 each have a couple of photosensitive regions 160a and 160b. One of the photosensitive region 160a is provided with a larger area or higher sensitivity than the other photosensitive region 160b. In each of the photosensitive regions 160a and 160b, a particular transfer gate, not shown, is formed, so that signal charges stored in the regions 160a and 160b can be read out either independently or simultaneously. Electrodes 160c and 160d are assigned to the transfer gates of the photosensitive regions 160a and 160b, respectively.

In an independent drive mode for reading out signal charges from the two photosensitive regions 160a and 160b individually, transfer gate drive signals, not shown, are fed to the electrodes 160c and 160d as a drive signal 26c, FIG. 1, such that the transfer gates each are opened at particular timing. In this mode, therefore, the signal charges all are read out from each cell 160 by two times of reading. On the other hand, in a simultaneous drive mode that is a usual drive mode, transfer gate drive signals are fed to the electrodes 160c and 160d such that the two transfer gates of each cell 160 are opened at the same time, thereby reading out all the signal charges by one time of reading.

In FIG. 2, letters R, G and B attached to the cells 160 are representative of the colors of color filter segments constituting the color filter 16b. The color filter segments shown in FIG. 2 are arranged in a so-called G square, RB full-checker pattern in which the color G is arranged in a square pattern while the colors R and B are arranged in a full-checker pattern.

FIGS. 3A and 3B compare the photosensitive cell 160 of the illustrative embodiment with a conventional photosensitive cell with respect to a relation between lightness and photometric output. In the illustrative embodiment, each cell 160 sequentially outputs a high-sensitivity output signal $HS_0$ and a low-sensitivity output signal $LS_0$ from the two photosensitive regions 160a and 160b, respectively, during one time of exposure. Therefore, as shown in FIG. 3A, the two output signals $HS_0$ and $LS_0$ cover a broad range of lightness 164. By combining the output signals $HS_0$ and $LS_0$ and using the resulting signal as photometric data, it is possible to attain information relating to a broad range of lightness by one time of exposure. The illustrative embodiment therefore enhances the probability that adequate exposure parameters can be produced by one time of exposure.

By contrast, as shown in FIG. 3B, a conventional photosensitive cell having only a single photosensitive region first produces a photometric output signal $S_0$ covering the range of lightness 166a, which is far narrower than the range 164, FIG. 3A. With such a narrow range of lightness 166a, it is difficult to attain adequate exposure parameters by one time of photometry. A system controller, therefore, newly sets exposure parameters for AE and again executes photometry. At this time, the photosensitive cell produces a photometric output signal $S_1$ covering a range of lightness 166b. Subsequently, the system controller corrects the exposure parameters and again executes photometry, so that the photosensitive cell produces a photometric output signal $S_2$ covering the range of lightness 166c. In this manner, the photosensitive cell with low sensitivity cannot output information over the broad range 164, FIG. 3A, unless extra exposure is effected, e.g. two times in addition to the first exposure, resulting in three times of exposure and three times of signal charge reading in total.

It will be seen from the above comparison that the cell 160 of the illustrative embodiment allows photometry to be completed by one time of exposure and two times of signal charge reading, reducing the period of time necessary for photometry, i.e. photometry time.

Figure 4:
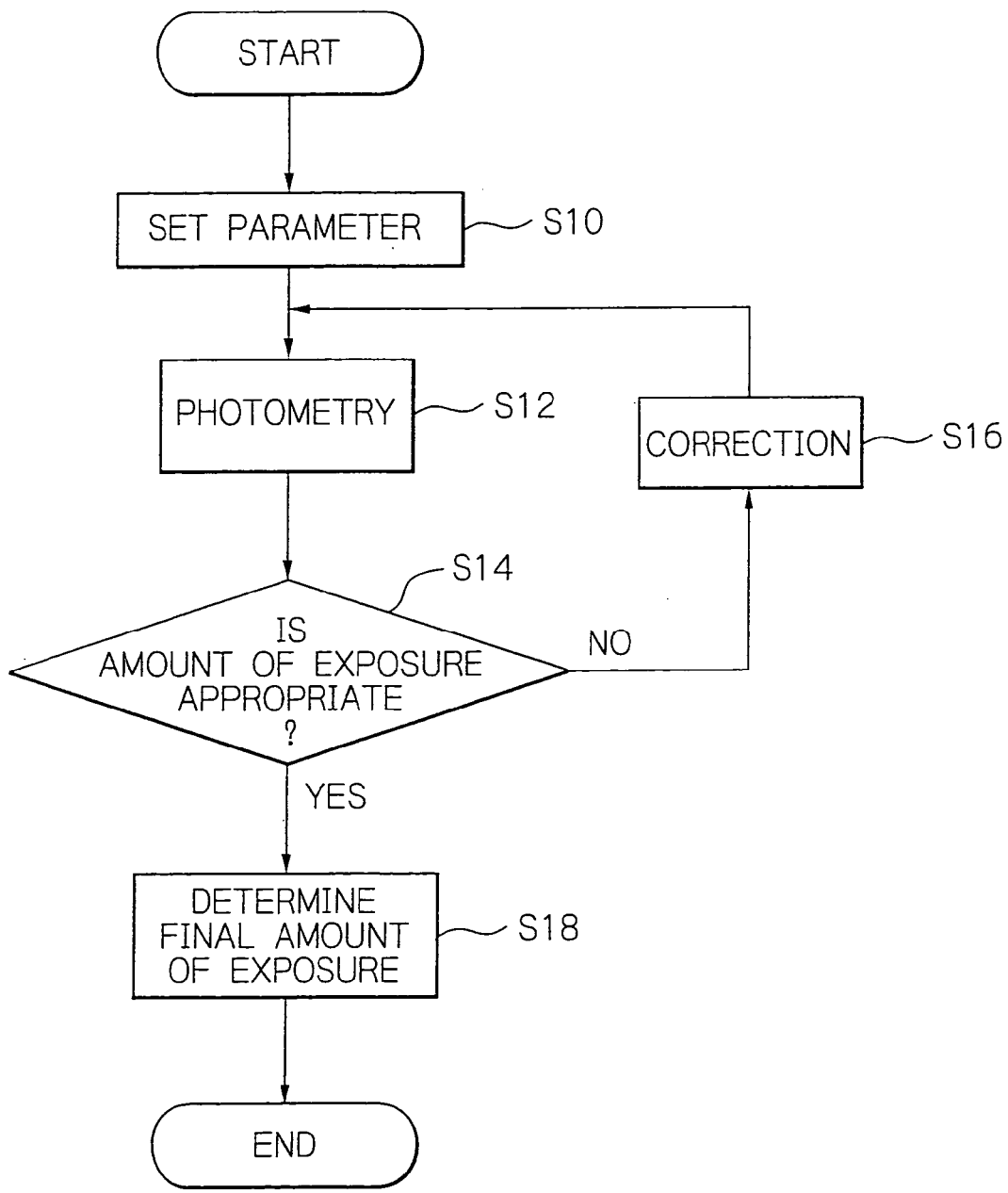
FIG. 4 is a flowchart useful for understanding a specific procedure available with the illustrative embodiment for determining exposure by photometry.

Reference will be made to FIG. 4 for describing a basic photometry procedure unique to the illustrative embodiment. First, the operator of the camera 10 turns on a power switch, not shown, of the camera, inputs desired photographing conditions, and then pushes the shutter release button 28 by the first stroke S1. In response, the shutter release button 28 sends out a trigger signal 28a to the system controller 20. As shown in FIG. 4, upon receiving the trigger signal 28a, the system controller 20 generates a control signal 20b indicative of exposure parameters initially set and sends out the control signal 20b to the timing signal generator 24 and driver 26 (step S10).

The timing signal generator 24 generates a timing signal 24a such that the image sensor 16c is exposed at a shutter speed indicated by the exposure control signal 20c and outputs the resulting signal charges. The timing signal 24a is fed to the driver 26. In response, the driver 26 delivers a drive signal 26c corresponding to the timing signal 24a to the image sensor 16c. At the same time, the driver 26 feeds a drive signal 26b corresponding to the control signal 20c, which controls the F number, to the iris control mechanism 14, causing the mechanism 14 to set the F number indicated by the drive signal 26b. Further, the driver 26 delivers a drive signal 26a for AF control to the lens system 12.

After the exposure parameters have been set (step S10), photometry is executed (step S12). More specifically, in the step S12, a light beam restricted by the iris control mechanism 14 is incident to the image sensor 16c. The image sensor 16c photoelectrically transduces the incident light over the exposure time and stores the resulting signal charges in the photosensitive cells 160. Subsequently, the signal charges are readout to the vertical transfer registers, then vertically transferred-toward the horizontal transfer registers, and then horizontally transferred via the horizontal transfer registers. The signal charges thus horizontally transferred are subjected to Q/V conversion to become an analog voltage signal 16d. The analog voltage signal 16d is fed from the image sensor 16c to the preprocessor 18.

The preprocessor 18 cancels noise contained in the analog voltage signal 16d, converts the resulting voltage signal 16d to associated digital image data 18a, and then sends out the image data 18a to the system controller 20. In the system controller 20, the EV calculating section 200 transforms the image data 18a to an estimation format for exposure to thereby produce EVs 204. The EVs 204 are fed to the exposure parameter determining section 202.

On receiving the EVs 204, the exposure parameter determining section 202 determines whether or not the EVs 204 are adequate as exposure parameters (step S14). This decision is made with the combination of exposure parameters meant for the photometry of the entire picture frame or angle of view, a predetermined spot of the frame, divided segments of the frame or the central area weighted of the frame. The determining section 202 corrects, if the answer of the step S14 is negative (NO), the combination of exposure parameters (step S16) or determines, if it is positive (YES), final exposure parameters (step S18).

In the step S16, the system controller 20 generates a control signal 20b representative of the combination of corrected exposure parameters and feeds the control signal 20b to the timing signal generator 24 and driver 26. As a result, photometry is again executed.

On the other hand, in the step S18, the exposure parameter determining section 202 weights the EVs 204 received from the EV calculating section 200 to produce final exposure parameters. Subsequently, the system controller 20 generates a control signal 20b representative of the combination of weighted exposure parameters and feeds the control signal 20b to the timing signal generator 24 and driver 26 (step S18), thereby completing photometry. Thereafter, when the operator pushes the shutter release button 28 by the second stroke S2 at desired timing, the shutter release button 28 sends out a trigger signal 28a to the system controller 20. Consequently, a desired subject is actually picked up in accordance with the final exposure parameters.

As stated above, the illustrative embodiment successfully reduces a period of time necessary for determining adequate exposure parameters although the photometry procedure per se described above appears basically similar to the conventional procedure.

Figure 5:
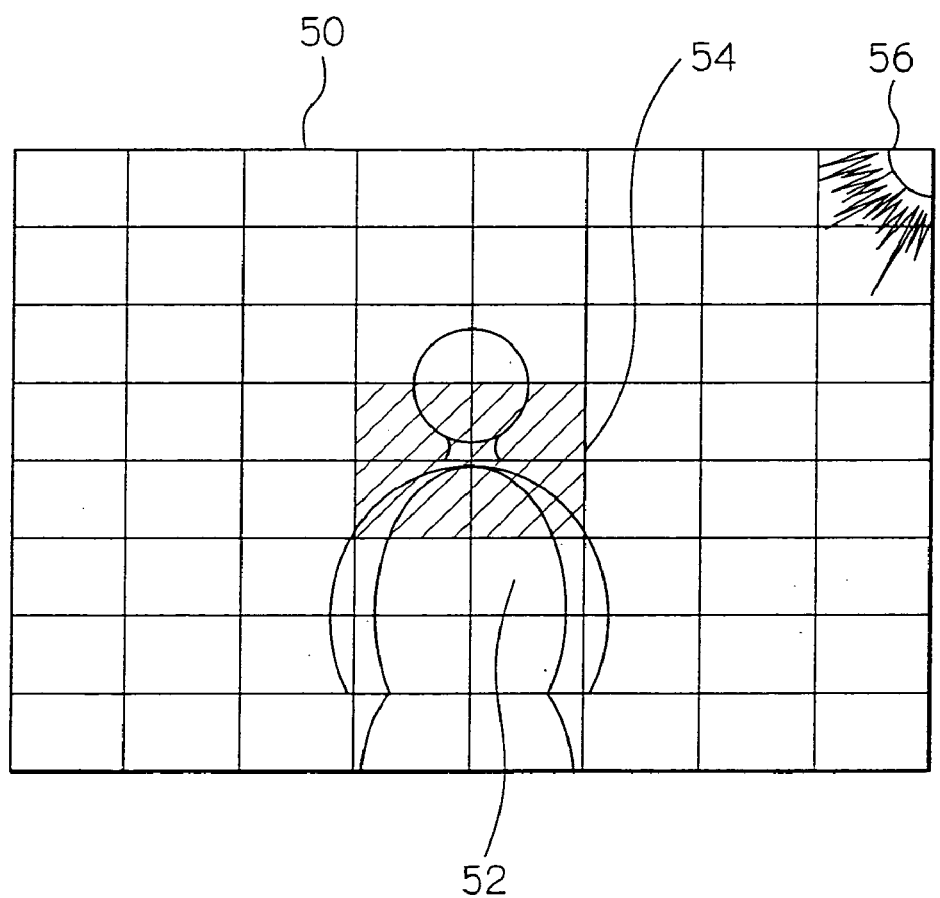
FIG. 5 schematically shows a specific main subject viewed in an image frame in the illustrative embodiment.

FIG. 5 shows a specific condition of a picture frame or angle of view 50 that may occur when photometry is executed with the center portion (center-weighted measuring) or the particular spot (spot metering) of the frame 50 as designated by the operator. As shown, a desired subject 52 is positioned at the central area of the frame 50, but receives little sunlight or little light issuing from a catch light or similar high-luminance element. In this specific condition, the center portion 54 of the frame 50, which is the subject of photometry, is relatively dark. On the other hand, a spot light source is present in the right edge portion 56 of the frame 50 in the figure, so that the photometric outputs of the image sensor 16c corresponding to the portion 56 saturate. It follows that photometric outputs should preferably be produced mainly from the photosensitive regions 160a of the photosensitive cells 160 having higher photometric accuracy than the other photosensitive regions 160b.

If the outputs of the photosensitive regions 160a saturate (NO, step S14), then, to make the decision stated earlier, use may be made of photometric outputs already read out from the photosensitive regions 160b and stored for a moment; signal charges are read out twice for one time of exposure. This is also successful in using photometric outputs derived from one time of exposure to generate exposure parameters, thereby reducing the photometry time.

Figure 6:
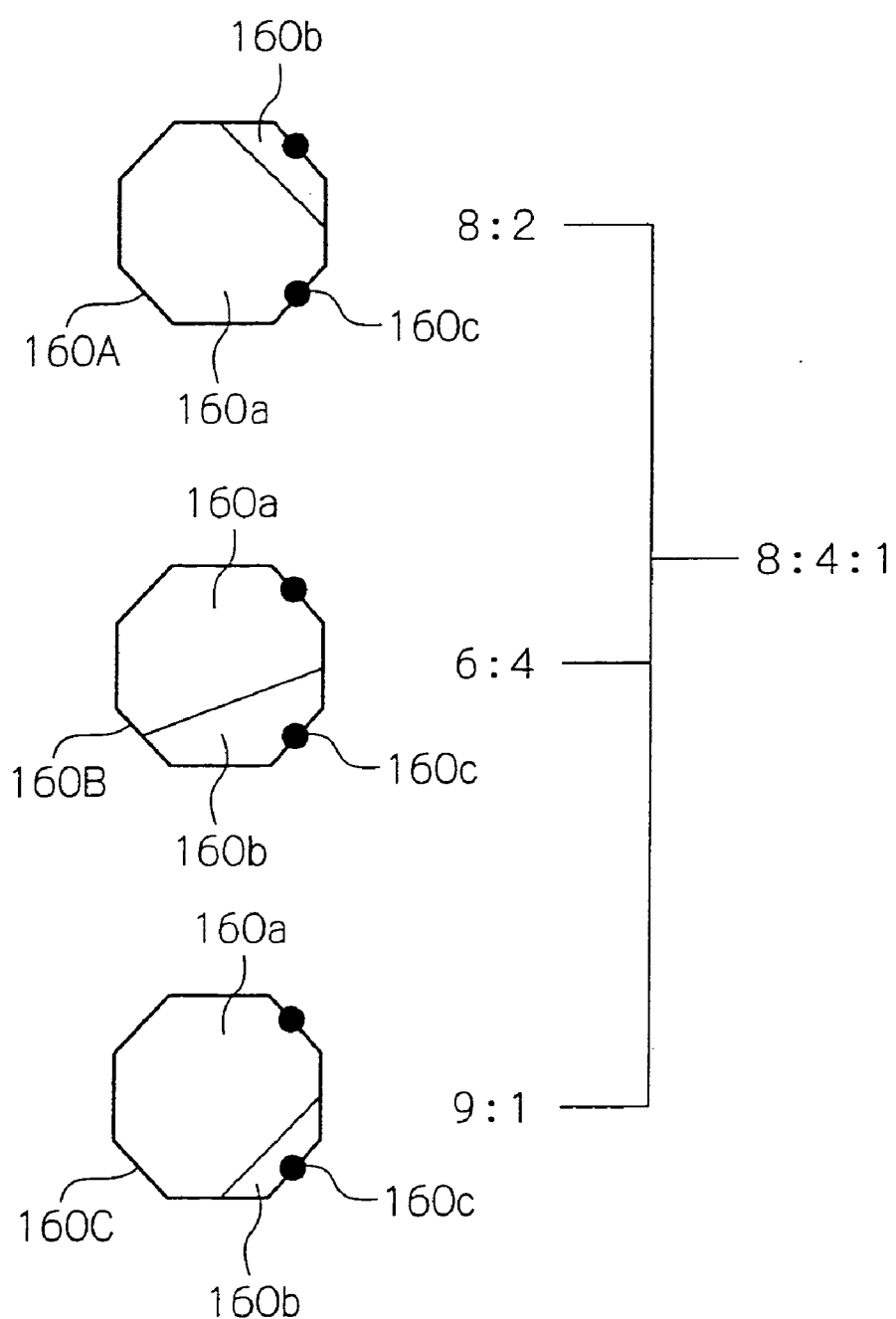
FIG. 6 schematically shows specific photosensitive cells applicable to the illustrative embodiment and each having a high- and a low-sensitivity region divided in a particular ratio.

Further, three kinds of photosensitive cells 160 different in sensitivity or photosensitive region from each other may be combined, as will be described hereinafter. FIG. 6 shows three kinds of photosensitive cells 160A, 160B and 160C to be combined specifically. As shown, the cell 160A has a high- and a low-sensitivity region 160a and 160b having an area ratio of 8:2. As for the cell 160B, the area ratio of the high-sensitivity region 160a to the low-sensitivity region 160b is 6:4. Further, as for the cell 160C, the above ratio is 9:1.

Figure 7:
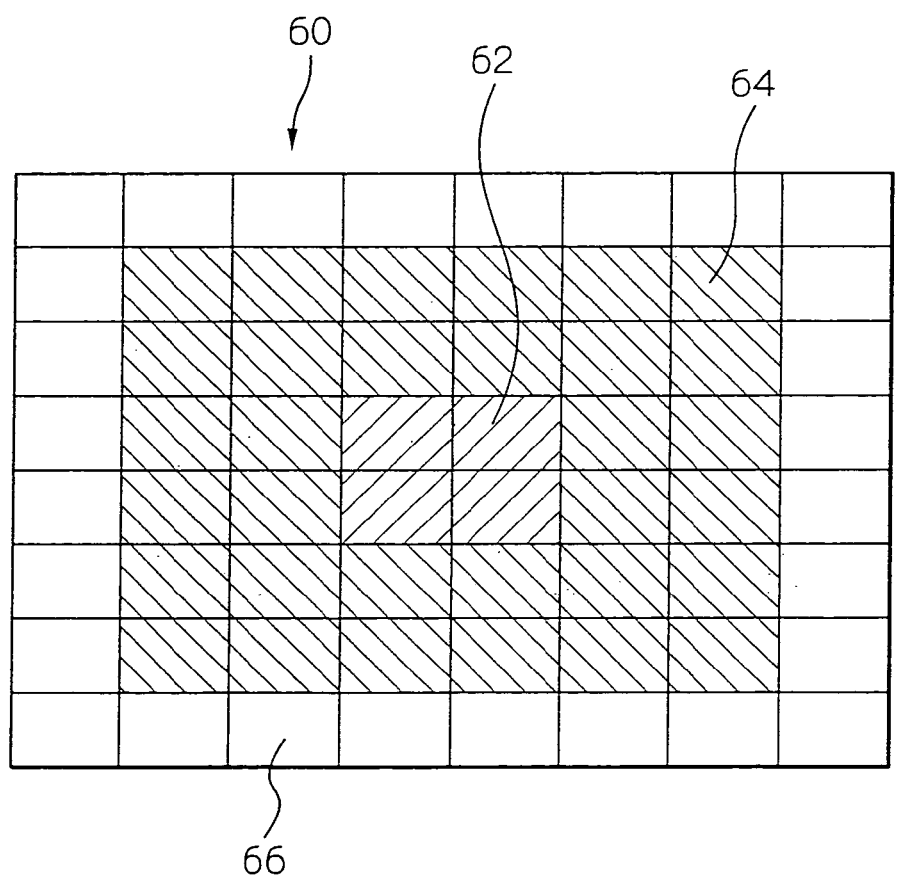
FIG. 7 shows three different photometric zones arranged in a viewing field in the illustrative embodiment.

FIG. 7 shows a specific arrangement of the above cells 160A, 160B and 160C that takes account of the photometric regions of the individual cell. As shown, a frame or angle of view 60 is segmented into, e.g. sixty-four blocks that are distributed to three zones, i.e. a central zone 62, an intermediate zone 64, and a peripheral zone 66. Among the sixty-four blocks, four blocks, thirty-two blocks and twenty-eight blocks are allotted to the central zone 62, intermediate zone 64 and peripheral zone 66, respectively.

The cells 160A, 160B and 160C are formed in the central zone 62, intermediate zone 64 and peripheral zone 66, respectively. To determine the amount of exposure, the results of photometry are weighted in dependence upon the position in the frame or angle of view, as stated earlier. It is to be noted that the weighting operation corresponds to a sensitivity ratio. When the area ratio of the individual photosensitive cell is matched to the sensitivity ratio as stated above, photometric outputs produced from the central zone 62, intermediate zone 64 and peripheral zone 66 are equivalent to signals already subjected to weighting.

The output ratio of the three zones 62, 64 and 66 is selected to be 8:4:1. In the illustrative embodiment, the regions of the cells 160A, 160B and 160C are divided such that a field shift gate signal is fed to one electrode of the individual cell so as to read out a signal charge to the associated vertical transfer register. More specifically, as shown in FIG. 6, the output ratio of the regions of the cells 160A, 160B and 160C to which the electrodes 160c are assigned is selected to be 8:4:1. The cells 160B and 160C each are divided in a particular manner so as to produce signal charges from their low-sensitivity regions 160b. Because the outputs of the cells 160A, 160B and 160C have already been weighted, as stated above, it is not necessary to execute the weighting operation for determining the amount of exposure, so that the photometry time using the exposure parameters is reduced.

As stated above, in the illustrative embodiment, the gates of the individual photosensitive cell are driven either independently or simultaneously by the timing signal output from the timing signal generator 24. In the independent drive mode, outputs with different sensitivity are produced from the two photosensitive regions of the individual cell by one time of exposure, covering the range of exposure sensitivity as broad as one achievable with usual repeated photometry. This reduces the number of times of exposure necessary for determining adequate exposure. In the simultaneous drive mode, the outputs of the two photosensitive regions of the individual cell are produced at the same time as usual. The resulting image signals for photometry are transformed to the values 204 having a predetermined format by the EV calculating section 200. Subsequently, exposure parameters corresponding to the adequate values 204 are determined by the exposure parameter determining section 202. As a result, a period of time necessary for determining the exposure parameters is reduced.

The above image signal can cover a broad range of sensitivity because each photosensitive cell is divided on the basis of the area ratio or sensitivity ratio.

Each photosensitive cell is divided in such a manner as to produce an image signal whose sensitivity ratio matches with the weighting operation. Each photosensitive region of the individual photosensitive cell is formed with a respective gate while the photosensitive cells are distributed to different photometry zones. Consequently, the photometric outputs of the image pickup section 16 are produced in the same manner as weighted image signals. It is therefore possible to omit the weighting operation as to exposure parameters for thereby reducing the overall processing time.

Further, the photometric method of the present invention is capable of reading out signal charges from the photosensitive regions 160a and 160b of the individual photosensitive cell at the same time by one time of exposure. In this case, a broad range of sensitivity or lightness can be metered by only one time of exposure. The resulting image signals are converted to EVs. The EVs are used to determine whether or not exposure parameters are adequate. Such a procedure contributes a great deal to the reduction of photometry time.

More specifically, the image signal read out from the high-sensitivity region 160a is used for the above decision in the event of center photometry or spot photometry stated earlier. When the image signal read out from the high-sensitivity region 160a saturates, the image signal read out from the low-sensitivity region 160b is used for the same decision. Consequently, there can be reduced the number of times of exposure and therefor processing time.

Moreover, a picture frame or angle of view is divided into a plurality of zones each provided with particular sensitivity matched to photosensitive area ratio. In this case, whether or not exposure parameters are adequate is determined on the basis of photometric outputs produced from the photosensitive cells belonging to the different zones by one time of exposure. This decision makes the weighting operation unnecessary for thereby reducing the photometry time.

In summary, in accordance with the present invention, a solid-state image pickup apparatus includes a timing signal generator for generating timing signals. Electrodes each assigned to a particular photosensitive region of the individual photosensitive cell are driven either independently or simultaneously in response to the timing signals. Particularly, in an independent drive mode, photometric outputs are produced from the different photosensitive regions of each photosensitive cell by one time of exposure, covering the range of sensitivity or lightness as broad as one achievable with a plurality of times of exposure. A format converter converts the resulting image signals to EVs having a predetermined format. A parameter determining circuit determines whether or not the above EVs are adequate and then uses the EVs, if they are adequate, to determine exposure parameters. The apparatus of the present invention therefore reduces the number of times of photometry necessary for determining adequate exposure, thereby reducing a period of time necessary for determining exposure parameters.

Further, in accordance with the present invention, a photometric method for the above image pickup apparatus executes photometry with preselected parameters to thereby read out signal charges from the different photosensitive regions of each photosensitive cell, thereby producing image signals. It is therefore possible to produce image signals covering a broad range of sensitivity or lightness by one time of exposure or photometry and therefore to increase the probability that adequate parameters can be attained by the decision on exposure using the region-by-region image signals. Consequently, there can be reduced the number of times of exposure. This is also true even when the exposure parameters are not adequate and exposure is repeated with corrected exposure parameters or when they are adequate and directly used.

The entire disclosure of Japanese patent application No. 2002-210561 filed on Jul. 19, 2002, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A solid-state image pickup apparatus comprising:
   a solid-state image sensor comprising a plurality of photosensitive cells arranged in bidimensional arrays for converting light incident from a desired scene to corresponding signal charges, a plurality of vertical transfer paths configured to transfer the signal charges in a vertical direction, and a horizontal transfer path configured to transfer the signal charges transferred by said plurality of vertical transfer paths in a horizontal direction,
   each of said plurality of photosensitive cells having a photosensitive area divided into at least two photosensitive regions,
   each of the photosensitive cells around a given photosensitive cell being shifted from the given photosensitive cell by substantially half a pitch which is defined as a distance between the photosensitive cells adjoining each other in the horizontal or the vertical direction,
   each two of said plurality of vertical transfer paths being formed between said photosensitive cells arranged in the horizontal direction, and extending round one array of said photosensitive cells,
   said image sensor being formed with electrodes for feeding open/close control signals to gates, which have an opening/closing function for reading out the signal charges from said at least two photosensitive regions of said photosensitive cells either individually or simultaneously;
   a timing signal generator for generating timing signals for driving said electrodes either individually or simultaneously;

a format converter for converting image signals derived from the signal charges, which are read out from said image sensor, to corresponding values having a predetermined format for photometry; and a parameter determining circuit for using a quantity of light incident during an exposure time and determining whether or not the values with the predetermined format are adequate, said parameter determining circuit weighting, if the values are adequate, the values to produce an amount of exposure, thereby determining exposure parameters for picking up the desired scene.

2. The apparatus in accordance with claim 1, wherein sensitivity of an individual photosensitive cell is determined in terms of an area ratio of said photosensitive regions or sensitivity of an individual photosensitive region.

3. The apparatus in accordance with claim 1, wherein said photosensitive regions of an individual photosensitive cell are divided in consideration of a ratio of weights assigned to image signals, which are produced from different zones constituting a frame where said photosensitive cells are arranged, said gate and said electrode being formed in each of said photosensitive regions.

4. The apparatus in accordance with claim 2, wherein said photosensitive regions of an individual photosensitive cell are divided in consideration of a ratio of weights assigned to image signals, which are produced from different zones constituting a frame where said photosensitive cells are arranged, said gate and said electrode being formed in each of said photosensitive regions.

5. A photometric method comprising:

a first step of preparing a solid-state image pickup apparatus comprising a solid-state image sensor which comprises a plurality of photosensitive cells arranged in bidimensional arrays for converting light incident from a desired scene to corresponding signal charges, and in which each of said plurality of photosensitive cells has a photosensitive area divided into a plurality of photosensitive regions, the photosensitive cells around a given photosensitive cell each are shifted from the given photosensitive cell by substantially half a pitch which is defined as a distance between the photosensitive cells adjoining each other in the horizontal or the vertical direction;

a second step of determining parameters for exposure of light incident to said photosensitive cells;

a third step of executing the exposure of said photosensitive cells in accordance with the determined parameters as photometry;

a fourth step of reading out signal charges derived from the photometry from each photosensitive region of an individual photosensitive cell;

a fifth step of determining whether or not the exposure in each of a plurality of photometry zones where said photosensitive cells are arranged is adequate;

a sixth step of correcting, if the exposure is not adequate, the parameters used for the photometry; and a seventh step of executing, if the exposure is adequate, a weighting operation with a result of the photometry to thereby determine exposure parameters for picking up the desired scene;

said third step to said fifth step being repeated after said sixth step.

6. The method in accordance with claim 5, wherein when either one of a center zone and a predetermined zone of the frame is designated as a photometry zone, a signal charge is read out only from one of said photosensitive regions of the individual photosensitive cell higher in sensitivity than the other photosensitive region or a signal charge is read out, when said signal charge saturates, from said other photosensitive cell.

7. The method in accordance with claim 5, wherein each of said photosensitive regions of the individual photosensitive cell outputs a signal charge weighted by a particular weight identical with a weight assigned to one of said photometry zones where said individual photosensitive cell is positioned, whereby the weighting operation of said seventh step is omitted.

8. The method in accordance with claim 6, wherein each of said photosensitive regions of the individual photosensitive cell outputs a signal charge weighted by a particular weight identical with a weight assigned to one of said photometry zones where said individual photosensitive cell is positioned, whereby the weighting operation of said sixth step is omitted.

* * * * *